Figure 1:
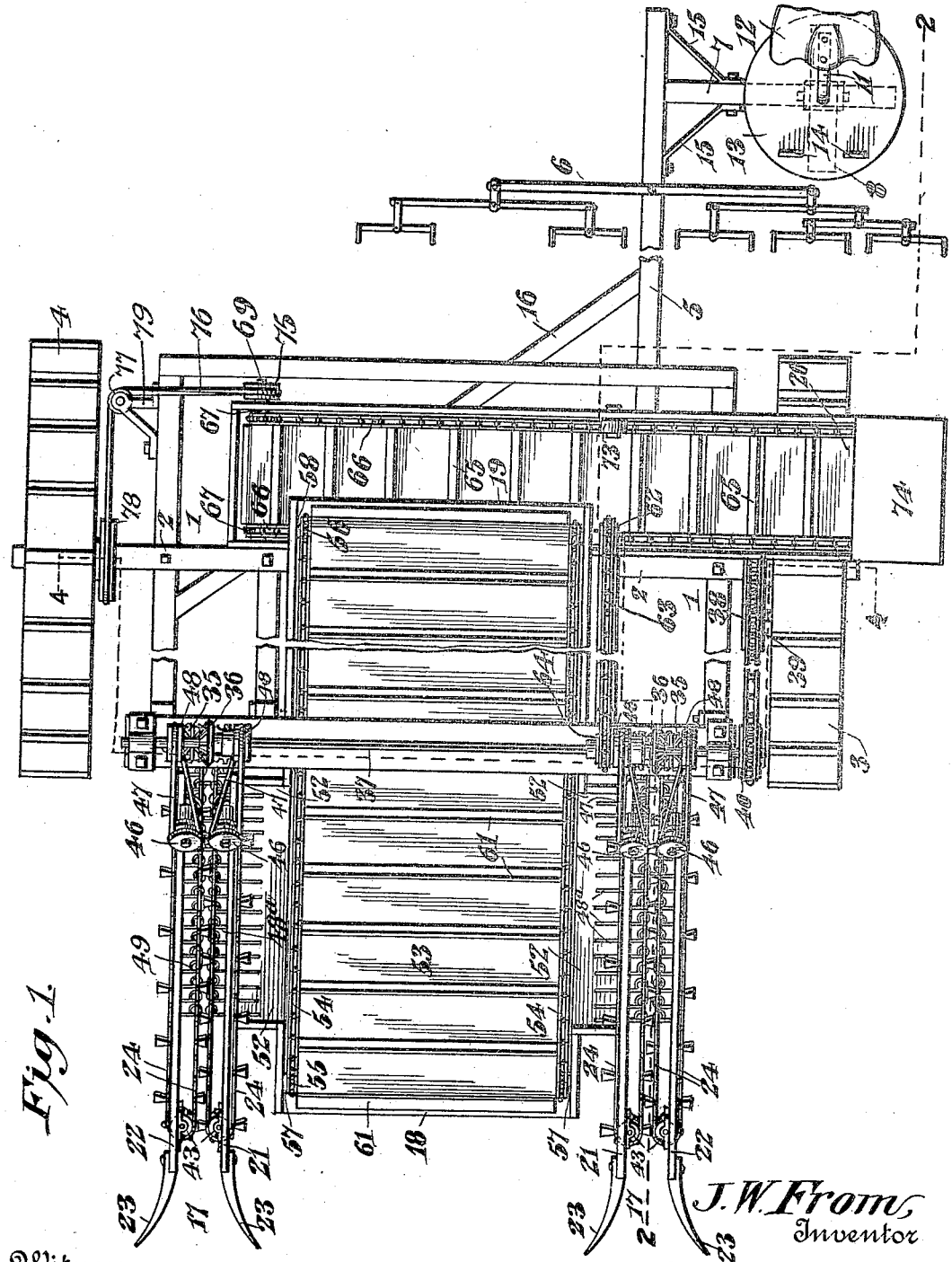

J. W. FROM.
CORN HARVESTER.
APPLICATION FILED MAR. 27, 1908.

942,820.

Patented Dec. 7, 1909.
4 SHEETS—SHEET 1.

Witnesses
Jas. K. McCathran
J. F. Riley

J. W. From,
Inventor

By C. G. Siggers
Attorney

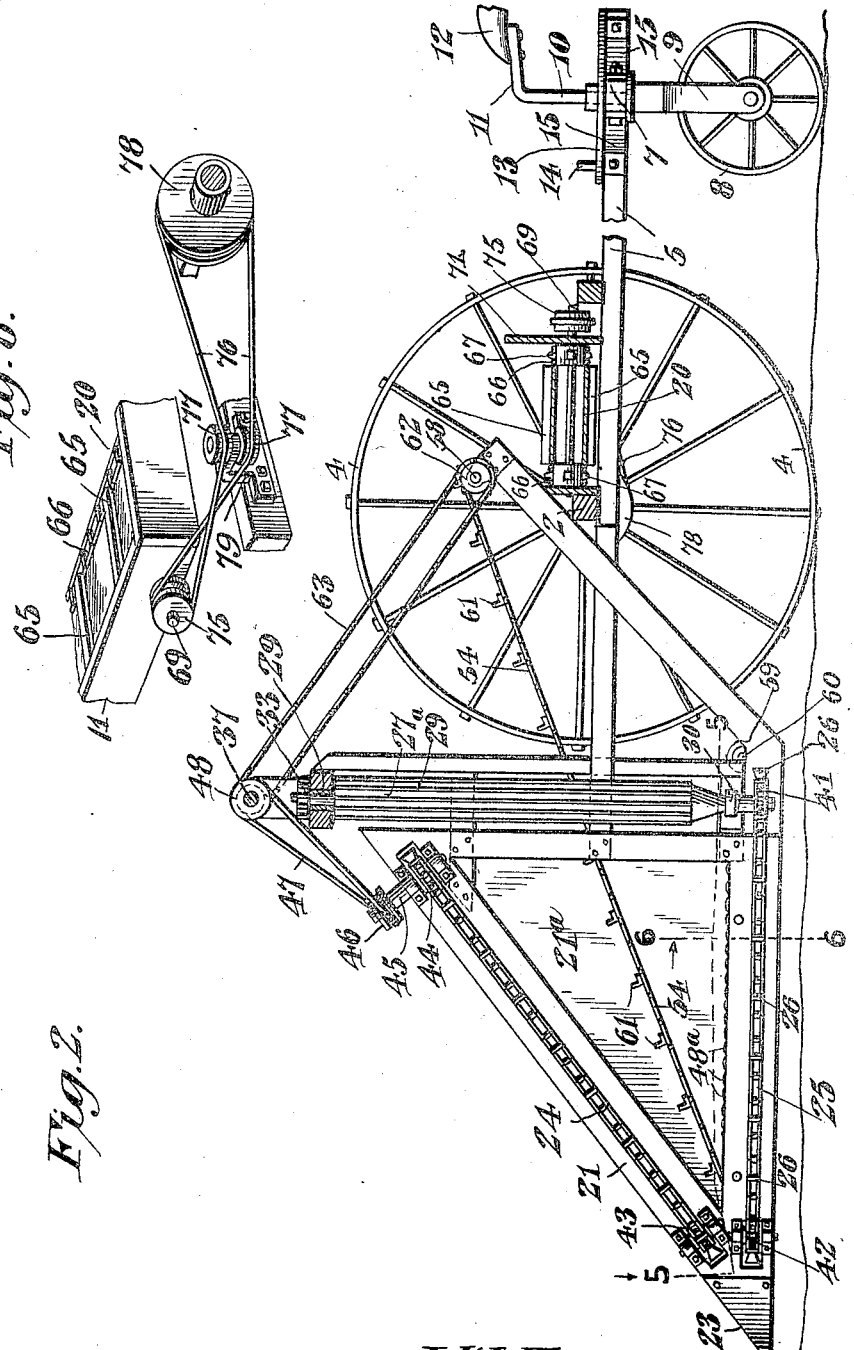

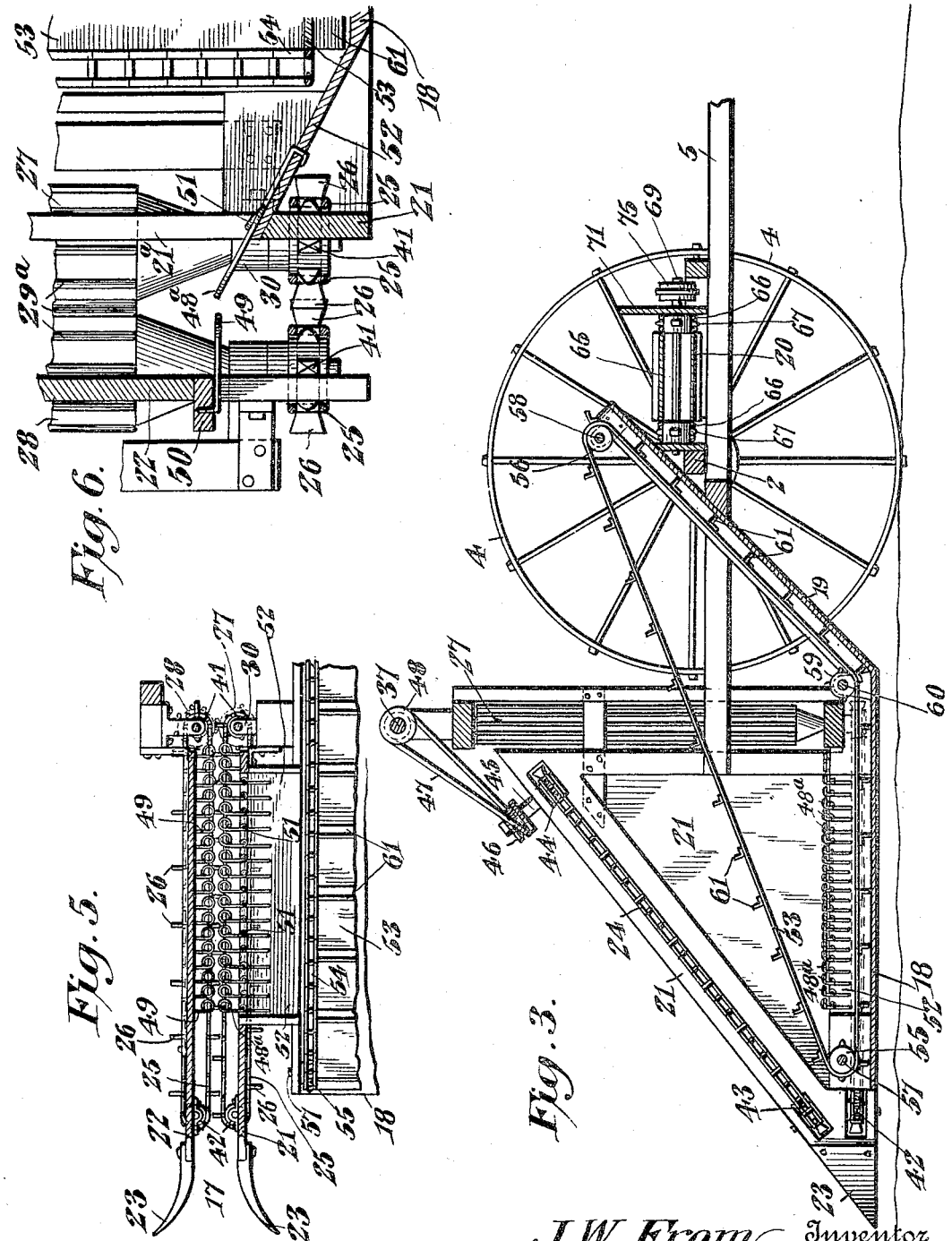

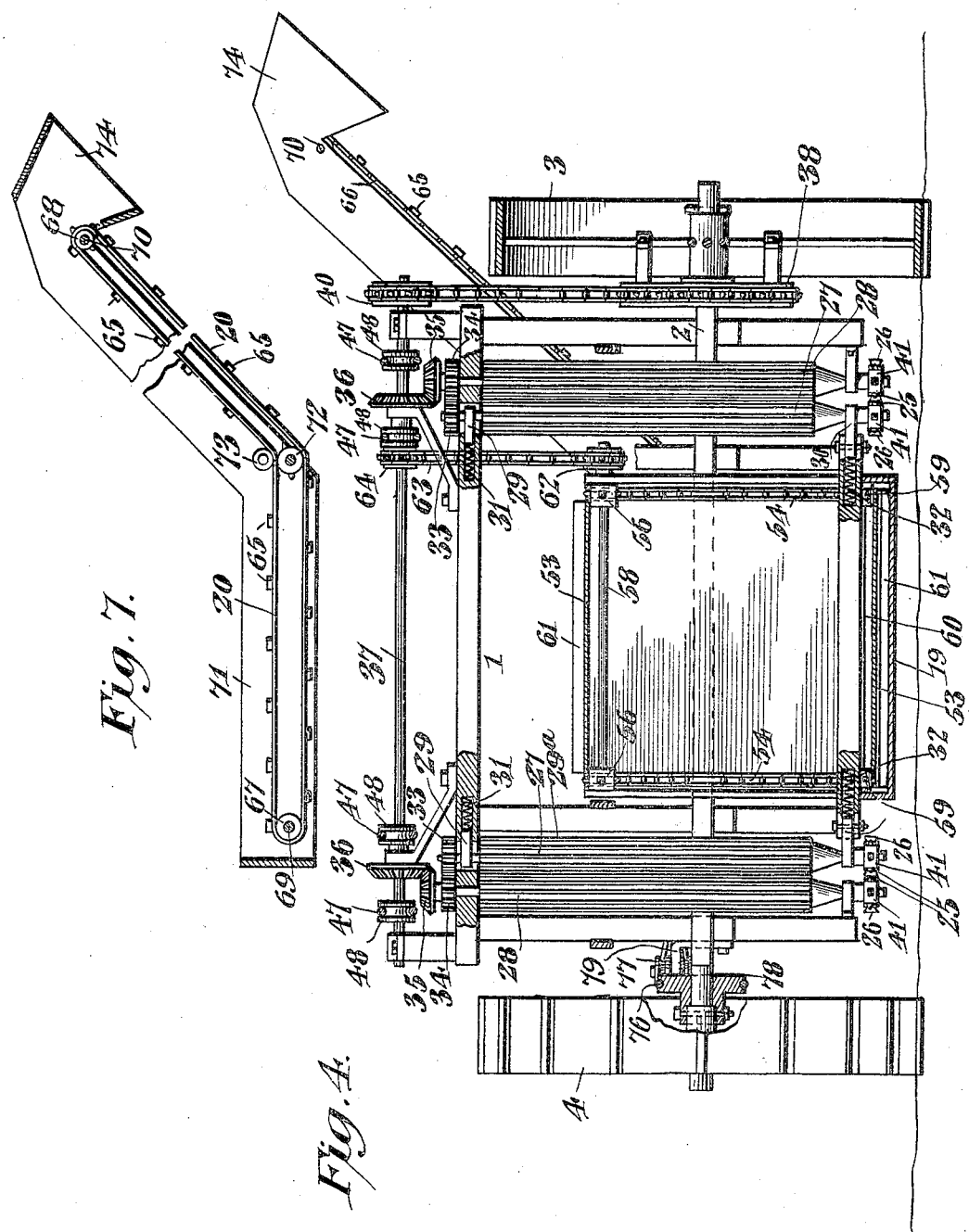

UNITED STATES PATENT OFFICE.

JAMES W. FROM, OF SHELBY, NEBRASKA.

CORN-HARVESTER.

942,820.

Specification of Letters Patent.

Patented Dec. 7, 1909.

Application filed March 27, 1908. Serial No. 423,748.

*To all whom it may concern:*

Be it known that I, JAMES W. FROM, a citizen of the United States, residing at Shelby, in the county of Butler and State of Nebraska, have invented a new and useful Corn-Harvester, of which the following is a specification.

The invention relates to improvements in corn harvesters.

The object of the present invention is to improve the construction of corn harvesters, and to provide a simple and comparatively inexpensive machine, adapted to save time and labor in gathering a crop of corn, and capable of removing the ears of corn from the husks without separating the latter from the stalks and of leaving the stalks in the field.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a corn harvesting machine, constructed in accordance with this invention. Fig. 2 is a longitudinal sectional view, taken substantially on the line 2—2 of Fig. 1. Fig. 3 is a central longitudinal sectional view. Fig. 4 is a transverse sectional view, taken substantially on the line 4—4 of Fig. 1. Fig. 5 is a horizontal sectional view on the line 5—5 of Fig. 2. Fig. 6 is a detail sectional view, taken substantially on the line 6—6 of Fig. 2. Fig. 7 is a detail sectional view, illustrating the construction of the transverse elevator. Fig. 8 is a detail perspective view, illustrating the gearing for connecting the transverse elevator with one of the traction wheels.

Like numerals of reference designate corresponding parts in all the figures of the drawings.

The machine includes a wheeled frame 1, provided with a suitable axle 2, having journals or spindles for the reception of traction wheels 3 and 4, which support the front of the machine. The frame is provided at one side with a rearwardly extending tongue 5 to which is pivoted a five horse draft equalizer 6.

The machine is pushed along by the draft animals, and the tongue is provided at its rear portion with a laterally extending arm 7, supported at its outer portion by a caster or guide wheel 8, mounted in a forked standard 9, having a vertical shank or pivot 10, which is journaled in a suitable bearing of the arm. The upper end of the shank or pivot 10 is provided with a rearwardly extending arm 11 upon which is mounted a seat 12 for the accommodation of the driver. The laterally extending arm 7 of the tongue supports a circular platform 13, suitably secured to the arm 7 and equipped at its front portion with foot rests 14, consisting of cleats and adapted to be engaged by the feet of the driver. The driver by bracing his feet against the foot rests 14 is adapted to readily guide the machine by oscillating the seat and thereby turning the caster or guide wheel. The laterally extending arm 7 is connected at an intermediate point with the tongue by braces 15, and the tongue is connected at an intermediate point with the frame by a brace 16.

The frame of the machine is provided at opposite sides with longitudinal passage-ways 17 for the corn, and it has a central longitudinal platform consisting of a front horizontal portion 18 and an inclined portion 19, extending upwardly and rearwardly from the front horizontal portion and terminating at a point above a transverse elevator 20. The passage-ways 17 are formed by vertical inner and outer walls or members 21 and 22 of substantially triangular form, disposed longitudinally of the machine and arranged parallel with each other. The inner and outer walls or members are provided at the front ends of the passage-ways with forwardly extending diverging guides 23 of substantially triangular form, tapered forwardly and secured at their rear edges to the sides or members. The guides 23, which are curved longitudinally, are adapted to direct the corn into the longitudinal passage-ways of the machine. The vertical walls or members of the passage-ways are suitably connected at their rear edges with the frame of the machine.

The standing corn is carried rearwardly along the passage-ways by means of upper inclined endless feeding chains 24, and lower horizontal endless feeding chains 25 provided at intervals with lugs or projections 26, extending laterally from the sides of the endless chains. The inner flights or stretches of the upper and lower feeding chains are spaced apart to receive the standing corn, and the lugs or projections 26 are of a length to extend nearly across the intervening space between the feeding chains. These lugs or projections positively feed the standing corn to vertical husking rolls 27 and 28, arranged in pairs and located at the rear ends of the longitudinal passage-ways.

The vertical rolls 27 and 28, which are journaled in suitable bearings at the top and bottom of the frame, are provided at intervals with longitudinal ribs 29$^a$, adapted to engage the stalks and the husks, whereby the ears are removed from the latter without separating the husks from the stalks. The stalks with the husks thereon are left standing in the field, although the stalks will be more or less broken and crushed. The machine, however, will not up-root the stalks, which are released by the rolls as soon as they pass through the latter. The rolls are preferably constructed of wood, and the spaced ribs 29$^a$, which form intervening grooves, may consist of longitudinal wires suitably secured to the rolls, but the latter may be corrugated in any other suitable manner.

The inner vertical rolls 27 are mounted in slidable bearings 29 and 30 and are yieldably held in engagement with the outer rolls by means of coiled springs 31 and 32, which bear against the upper and lower slidable bearings 29 and 30. The upper journals of the rolls are equipped with intermeshing spur gears 33 and 34, and the upper journals of the outer rolls are extended and have secured to them horizontal bevel gears 35, which mesh with vertical bevel gears 36. The vertical bevel gears 36 are mounted on a main transverse shaft 37, journaled in suitable bearings at the top of the frame and connected by sprocket gearing with the left hand traction wheel 3. The left hand traction wheel carries a sprocket wheel 38, which is connected by a sprocket chain 39 with a sprocket pinion 40, mounted on the left hand end of the shaft 37. When the machine moves forward, motion is communicated from the traction wheel 3 to the vertical husking rolls 27 and 28.

The lower journals of the vertical husking rolls are equipped with sprocket pinions 41, which receive the rear portions of the lower horizontal feed chains 25, and the front portions of the latter are arranged on front sprocket wheels 42, mounted in slots in the front portions of the side walls or members 21 and 22. The upper inclined feeding chains are mounted on front and rear sprocket wheels 43 and 44, arranged in front and rear slots of the side walls or members 21 and 22. The front sprocket wheels of the upper and lower feeding chains are mounted on suitable shafts, which are journaled in bearings at the top and bottom of the slots, which receive the front sprocket wheels. The rear sprocket wheels of the upper feeding chains are mounted on short inclined shafts 45, journaled in suitable bearings of the side walls or members, and equipped at their upper ends with grooved pulleys 46, which are connected by belts 47 with pulleys 48 of the main transverse shaft, which operates the upper feeding chains.

The husked ears of corn fall upon resilient fingers 48$^a$ and 49, arranged in inner and outer rows and forming a bottom support for the corn to prevent the ears from dropping upon the ground. The fingers consist essentially of loops and straight transverse shanks. The loops are spaced apart at the median line of the passageways, and are adapted to be readily deflected by the standing corn. The outer springs 49, which are arranged horizontally, are secured to the lower faces of the horizontal bars 50, extending outwardly from the rear portions of the outer side walls 22 at the lower edges thereof. The inner rows of longitudinal fingers are provided at intermediate points with spring coils 51, and they are mounted on an inclined deflecting bar or member 52, extending downwardly and secured at its lower edge to the horizontal front portion of the platform and extending upwardly and outwardly therefrom to triangular openings 21$^a$ of the inner walls of the side passages. The inclined fingers and the inclined deflecting bars or members are adapted to cause the ears of corn to fall upon the horizontal front portion of the platform, and the openings 21$^a$ permit the ears to pass through the inner walls 21.

The ears of corn are carried rearwardly and upwardly from the horizontal front portion of the platform to the transverse elevator by means of an endless conveyer 53, provided at its side edges with endless chains 54, meshing with front and rear sprocket wheels 55 and 56 of front and rear transverse shafts 57 and 58 and with intermediate sprocket wheels 59 of a transverse shaft 60. The intermediate sprocket wheels 59 divide the lower flight or stretch of the endless conveyer into a front horizontal portion and a rear inclined portion, the horizontal and inclined portions of the lower flight or stretch being arranged in spaced relation with the horizontal and inclined portions of the platform and in parallelism with the same. The endless conveyer is provided at intervals with transverse slats or bars 61, which are adapted to engage and carry the ears rearwardly and upwardly along the central longitudinal platform of the machine. The front, rear and intermediate shafts of the endless conveyer are journaled in suitable bearings, and the rear transverse shaft 58 carries a sprocket wheel 62, which is connected by a sprocket chain 63 with a sprocket wheel 64 of the main transverse shaft. The sprocket gearing, which connects the main transverse shaft with the longitudinal conveyer, extends downwardly and rearwardly from the said transverse shaft, as clearly shown in Figs. 1 and 2 of the drawings.

The ears of corn carried rearward by the conveyer fall upon the transverse elevator 20, composed of an inner horizontal portion and an outer inclined portion. The elevator 20 includes an endless apron, provided at intervals with transverse slats or bars 65 and having side sprocket chains 66, which mesh with inner and outer sprocket wheels 67 and 68 of shafts 69 and 70. The shafts are journaled in suitable bearings of the frame 71 of the elevator, and the flights or stretches of the endless apron are divided into inner horizontal portions and outer inclined portions by idler sprocket wheels 72 and pulleys 73. The sprocket wheels 72 mesh with the chains of the lower flight or stretch of the endless apron, and the pulleys engage the upper flight or stretch, as clearly illustrated in Fig. 7 of the drawings.

The frame of the elevator is provided at its upper end with a spout 74, which discharges into a wagon, driven at the left hand side of the machine. The inner shaft 69 is extended rearwardly and carries a pulley 75, which receives a belt 76, and the latter extends transversely of the machine from the pulley 75 to a pair of guide pulleys 77, and then forwardly in a direction longitudinally of the machine to a driving pulley 78, which is connected with the right hand traction wheel of the machine. The guide pulleys 77 are mounted in a bracket 79, secured to and projecting from one side of the frame near the back thereof, as clearly shown in Fig. 1 of the drawings.

Any other suitable gearing may be employed for operating the elevator.

Having thus fully described my invention, what I claim as new and desire to secure by Letters Patent, is:—

1. A corn harvesting machine including a frame provided at opposite sides with passage-ways for the standing corn and having an intermediate platform arranged to receive the ears of corn, husking rolls located at the rear ends of the passage-ways for removing the ears from the husks without separating the latter from the stalks, and means carried by the frame for causing the ears of corn to fall upon the platform.

2. A corn harvesting machine including a frame provided at opposite sides with passage-ways for the standing corn and having an intermediate platform arranged to receive the ears of corn, husking rolls located at the rear ends of the passage-ways for removing the ears from the husks without separating the latter from the stalks, means carried by the frame for causing the ears of corn to fall upon the platform, and means for conveying the ears of corn rearwardly.

3. A corn harvesting machine including a frame provided at opposite sides with passage-ways for the standing corn and having an intermediate platform arranged to receive the ears of corn, husking rolls located at the rear ends of the passage-ways for removing the ears from the husks without separating the latter from the stalks, means carried by the frame for causing the ears of corn to fall upon the platform, an elevator located in rear of the platform, and means for conveying the ears of corn rearwardly from the platform to the elevator.

4. A corn harvesting machine including a frame provided at opposite sides with passage-ways for the standing corn and having an intermediate platform arranged to receive the ears of corn, husking rolls located at the rear ends of the passage-ways for removing the ears from the husks without separating the latter from the stalks, means carried by the frame for causing the ears of corn to fall upon the platform, and an endless conveyer arranged above and spaced from the platform and provided with means for engaging the ears of corn for conveying the same rearwardly.

5. A corn harvesting machine including a frame provided at opposite sides with passage-ways for the standing corn and having an intermediate platform composed of a front horizontal portion and a rear inclined portion, husking rolls located at the rear ends of the passage-ways for removing the ears from the husks without separating the latter from the stalks, means for causing the ears of corn to fall upon the platform, and a longitudinal conveyer having a lower flight or stretch composed of a front horizontal portion and a rear inclined portion spaced from and coöperating with the platform.

6. A corn harvesting machine including a frame provided at opposite sides with passage-ways for the standing corn and having an intermediate platform arranged to receive the ears of corn, vertical husking rolls located at the rear ends of the passage-ways for removing the ears from the husks without separating the latter from the stalks, an endless conveyer located above and spaced from the platform and provided with means for engaging the ears of corn, and a transverse elevator arranged to receive the ears from the conveyer and extending from one side of the machine.

7. A corn harvesting machine including a frame provided with spaced walls forming a longitudinal passage-way for the standing corn, one of the walls having an opening, husking rolls arranged at the rear end of the passage-way, a platform extending along one side of the passage-way in a direction longitudinally of the same from the front of the machine to the rear portion thereof and located adjacent to the wall having the said opening, means located at the bottom of the passage-way for supporting the ears and for directing the same through the said opening onto the platform, and an elevator arranged transversely of the machine and located at the rear end of the platform.

8. A corn harvesting machine including a frame provided with a passage-way and having a platform, husking rolls arranged at the rear end of the passage-way, and resilient fingers arranged at the bottom of the passage-way for supporting the ears of corn.

9. A corn harvesting machine including a frame provided at opposite sides with passage-ways and having an intermediate platform, husking rolls arranged at the rear ends of the passage-ways, and resilient fingers arranged in rows at the bottoms of the passage-ways for supporting the ears of corn, said rows being spaced apart to permit the stalks of standing corn to pass between them.

10. A corn harvesting machine including a frame provided at opposite sides with passage-ways and having an intermediate platform, husking rolls arranged at the rear ends of the passage-ways, and inner and outer rows of resilient fingers located at the bottoms of the passage-ways, the outer fingers being horizontal and the inner fingers being inclined for directing the ears of corn onto the platform.

11. A corn harvesting machine including a frame provided with a passage-way and having a platform, husking rolls arranged at the rear end of the passage-way, and inner and outer rows of resilient fingers consisting of springs provided with terminal loops spaced apart to permit the stalks of standing corn to pass between them.

12. A corn harvesting machine including a frame provided with a passage-way and having a platform, husking rolls arranged at the rear end of the passage-way, and inner and outer rows of springs consisting of transverse shanks and terminal loops arranged to support the ears of corn and to be deflected by the stalks of standing corn.

13. A corn harvesting machine including a frame provided with a passage-way for the standing corn and having a platform provided with an inclined deflecting bar or member for causing the ears of corn to fall upon the platform, husking rolls located at the rear end of the passage-way, and means located at the bottom of the passage-way for supporting the ears of corn.

14. A corn harvesting machine including a frame provided with a passage-way for the standing corn and having a platform provided with an inclined deflecting bar or member for causing the ears of corn to fall upon the platform, husking rolls located at the rear end of the passage-way, and inner and outer resilient fingers arranged in rows at the bottom of the passage-way, the inner fingers being inclined and secured to the inclined bar or member.

15. A corn harvesting machine including a frame provided with a passage-way for the standing corn and having a platform provided with an inclined deflecting bar or member for causing the ears of corn to fall upon the platform, husking rolls located at the rear end of the passage-way, and inner and outer resilient fingers arranged in rows at the bottom of the passage-way, the inner fingers being provided with intermediate coils and mounted on the inclined bar or member.

16. A corn harvesting machine including a frame having a platform and provided with a passage-way located at the side of the platform, and inner and outer rows of resilient supporting fingers arranged at the bottom of the passage-way and located above the platform.

17. A corn harvesting machine including a frame having a platform and provided with a passage-way located at the side of the platform, and inner and outer rows of resilient supporting fingers arranged at the bottom of the passage-way and located above the platform, the inner row of fingers being set at an inclination for causing the ears of corn to fall upon the platform.

18. A corn harvesting machine including a wheeled frame having a central longitudinal platform and provided at opposite sides thereof with spaced inner and outer approximately triangular walls forming longitudinal passages, the inner walls being provided with openings, husking rolls located at the rear ends of the passages, upper and lower endless feeding chains located at the top and bottom of the said openings for carrying the standing corn to the husking rolls, and means for causing the ears of corn to fall through the said openings onto the platform.

19. A corn harvesting machine including a frame provided at opposite sides with passage-ways, vertical husking rolls located at the rear ends of the passage-ways, lower feeding chains extending along the passage-ways and connected with the lower ends of the rolls, upper feeding chains arranged at an inclination at the said passage-ways, inclined shafts located at the upper ends of the upper chains and provided with pulleys, a transverse shaft mounted on the frame and carrying pulleys, and belts connecting the pulleys of the inclined shafts with those of the main shaft.

In testimony, that I claim the foregoing as my own, I have hereto affixed my signature in the presence of two witnesses.

JAMES W. FROM.

Witnesses:
CLYDE J. LICHLITER,
JNO. EBERLY.